May 25, 1943.
R. W. OLSEN
2,320,194
FLUID FLOW CONTROL
Filed April 29, 1941
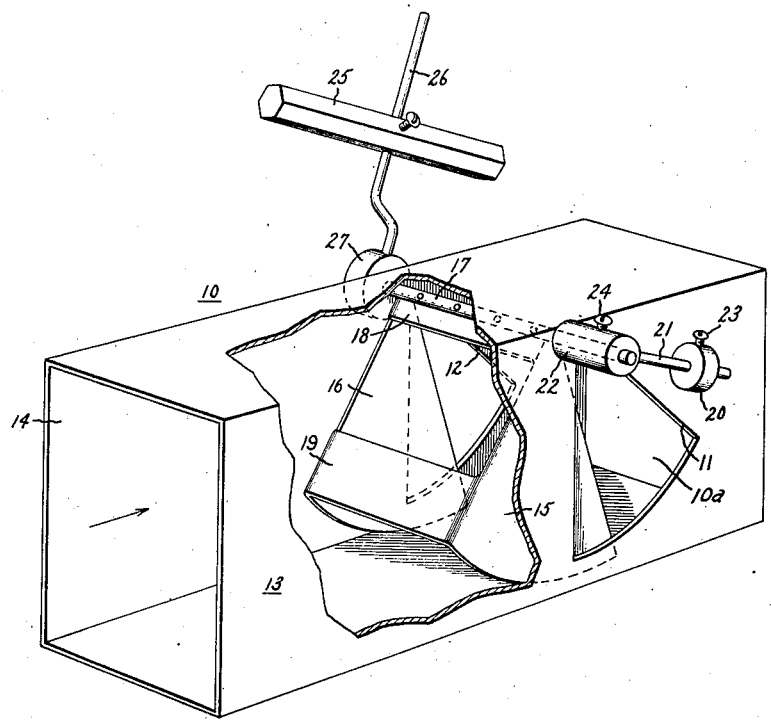
Inventor:
Ronald W. Olsen,
by Harry E. Dunham
His Attorney.

Patented May 25, 1943

2,320,194

UNITED STATES PATENT OFFICE 2,320,194

FLUID FLOW CONTROL

Ronald W. Olsen, Bloomfield, N. J., assignor to General Electric Company, a corporation of New York Application April 29, 1941, Serial No. 390,965

3 Claims. (Cl. 137—152)

My invention relates to fluid flow controls, and to an arrangement for controlling the rate of fluid flow to a device upon variations of the velocity of the fluid flow, and although not limited thereto, it may be employed as an air flow control.

Air flow controls have efficient application for controlling the flow of air to a space, or other suitable device, and for controlling the flow of combustion air to a furnace, particularly when an automatic fuel feeding arrangement, such as a stoker, is employed. Heretofore, air flow control arrangements for stokers have included a damper arrangement in a duct which conducts the combustion air to the furnace, and diaphragms or linkages for controlling the movement of the damper in order to maintain the flow of air to the furnace within a predetermined range or at a substantially constant value during variations in the thickness of the fire bed.

It is, therefore, an object of my invention to provide an improved multivane swinging damper arrangement for controlling the flow of a fluid.

Another object of my invention is to provide an improved multivane swinging damper arrangement for controlling the flow of fluid through a duct within a predetermined range during variations in the velocity of the fluid passing through the duct.

Further objects and advantages of my invention will become apparent from the following description referring to the accompanying drawing, and the features of novelty which characterize my invention will be pointed out with particularity in the claims annexed to and forming a part of this specification.

In the drawing the single figure is a perspective view, in partial section, of a duct having a fluid flow control which is provided with an embodiment of my invention.

In the arrangement illustrated in the drawing, a fluid flow control is provided for controlling the rate of flow of any suitable fluid, such as air, passing into a device or through a duct, within suitable limits or within a predetermined range during variations in velocity of the air passing into the device or through the duct, or during variations in pressure differential between the intake and exhaust ends thereof. The control includes a substantially straight passage or duct closed at the end but having a lateral exhaust port or outlet opening formed in a side wall thereof for the air leaving the passage or duct and a damper movably mounted in the duct or passage having a shutoff vane adapted to move laterally across the outlet port to vary the effective area thereof due to the overlapping of the shutoff vane, and a control vane substantially perpendicular to the shutoff vane so that it moves substantially along the path of movement of the axial flow of the air within the duct so that variations in the velocity thereof will vary the position of the damper. As shown in the drawing, the lateral exhaust port is formed in a side wall of the duct adjacent the closed end thereof to provide a zone for substantially straight fluid flow in the duct ahead of the lateral flow through the exhaust port. A weight member is also provided for opposing the movement of the damper during variations in the velocity of the air. The damper is pivotally mounted on a shaft and is so balanced with respect to the weight that when no air is flowing through the passage a substantially maximum opening will be presented. However, as the velocity of the air is increased it will push against the control vane and move the damper against the force of the weight in order to cause the shutoff vane to move laterally across the outlet port of and decrease the effective area thereof while at the same time extending the zone of substantially straight air flow in the duct. By suitably proportioning the size of the control vane and the amount of the weight and its relation with respect to the center of gravity of the damper, the flow of air into a device or through a duct may be controlled with a predetermined range during variations in the velocity of the air.

Referring more particularly to the drawing, I have illustrated a fluid flow control which may be adapted to control the flow of air to a furnace and which includes a rectangular duct indicated generally by the numeral 10. The combustion air for the furnace enters the duct 10 from the left as indicated by the arrow and leaves the duct through the openings 11 and 12 to pass through suitable passages (not shown) into the furnace combustion chamber. Thus the duct 10, as shown, has an end wall 10a and a pair of opposing sector-shaped exhaust openings 11 and 12, formed adjacent the closed end of the duct in the parallel side walls 13 and 14 respectively. In order to control the effective area of the exhaust openings I provide a damper having a shutoff vane 15 preferably of sector shape as shown which is adapted to move transversely across the outlet opening 11 into increasing overlapping relation therewith so as thereby to restrict the flow therethrough while extending the zone of substantially straight air flow in duct 10 ahead of the lateral fluid flow outlet opening 15. When the opposing sector-shaped outlet opening 12 is employed a similar sector-shaped shutoff vane 16 may also be provided which will, therefore, be substantially parallel to the shutoff vane 15 for controlling the effective area of the opening 12. The damper may be mounted for swinging movement lengthwise of the duct 10 in any suitable manner, and in the arrangement illustrated in the drawing I have provided a shaft 17 which is pivotally mounted in the side walls 13 and 14 of the duct 10. The damper has a portion 18 which is attached to the shaft 17 and a control vane portion 19 which extends between the shutoff vanes 15 and 16 and is substantially perpendicular thereto. In order to impede the movement of the damper around the shaft or pivot 17 upon variations in the velocity of the air, I have provided a weight 20 which is supported by a bracket or shaft 21 which is in turn supported at one end by a collar 22 which is mounted on an end of the shaft 17. A screw 23 may be provided so that the weight 20 may be slid along the shaft 21 to the desired place and tightly secured. A screw 24 also may be provided through the collar 22 in order that the collar 22 may be moved on the shaft so as to vary the angle of the shaft 21 with respect to the damper and then tightly secured in the desired position. Another weight 25 may be provided which is slidably mounted on a shaft or bracket 26 which is in turn mounted on a collar 27 on an end of the shaft 17 so as to counterbalance the weight of the damper. The two weights may be combined into one weight having an equivalent effect, if desired, or any other suitable biasing arrangement may be provided.

Operation of my air flow control is as follows: When no air is flowing through to the duct 10 the damper and counterweights will be so balanced that the shutoff vanes 15 and 16 will move substantially out of register with the exhaust openings 11 and 12, as illustrated. Upon air being caused to flow through the duct 10 and as the velocity thereof increases, the air will push against the surface of the control vane 19, and against the force produced by the counterweight 20, causing the damper to move to some position so that a portion of the openings 11 and 12 are closed by their respective shutoff vanes 15 and 16. For any particular velocity of air flow the position of the shutoff vanes 15 and 16 will be dependent upon the torque produced by counterweight 20 and the amount of torque produced by the air impinging upon the control vane 19. It will be seen that by varying these two relative quantities the range of operation of my air flow control may be varied. Since the axis of movement of the damper is perpendicular to the surfaces of the shutoff vanes 15 and 16 it will be seen that these vanes can produce no torque to move the damper. The torque produced to move the damper will, therefore, be dependent upon the axial velocity of the air passing through the duct 10 towards the two outlet openings 11 and 12 since the control vane 19 is located in the axial air flow zone that lies ahead of the lateral air flow through the outlet openings 11 and 12 that is controlled by the throttling vanes 15 and 16. Thus the restriction to air flow imposed by the control vane is relatively small and substantially constant throughout the limted range of swinging movement of the damper. Therefore, as the air flow tends to increase, the velocity responsive control vane swings the parallel throttling vanes to a more closed position just enough to counteract the increased velocity. In this manner a substantially constant amount of air flow through the exhause openings may be obtained during changes in velocity.

Since the parallel throttling vanes 15 and 16 are both perpendicular to the axis of the damper and also parallel to the axial air flow within the duct 10 toward the two exhaust openings 11 and 12, these vanes can produce no appreciable torque tending to swing the damper. Moreover, with the damper control parts proportioned to maintain a constant air flow within the duct, the static pressure forces effective on the opposite sides of the control vane 19 become so nearly equal that their differential is practically negligible. However, by proportioning the vanes and counterweight 20 and the angle between the shaft 21 and the damper the air flow characteristic may be made negative, that is more air may be allowed to be exhausted through the openings 11 and 12 as the velocity decreases. Such a characteristic is desirable with some types of stokers so that with a thick fire bed more air may be supplied Any other suitable air flow characteristic or range of operation may be obtained. When applying my air flow control in an air conditioning system at the outlet of a duct leading into a room one exhaust opening 11 may be employed which exhausts into the room. However, it will be seen that when two outlets 11 and 12 are provided no thrust bearing for the shaft 17 is needed.

Although my fluid flow control finds efficient application for controlling the flow of air into a device such as a furnace, it is to be understood that my invention is applicable for the control of the flow of a liquid or any other suitable fluid.

Also, although I have shown the duct 10 with opposite walls being parallel, it will be apparent that my invention may be applied to a duct having a circular cross section or any other suitable shape. Furthermore, the exhaust openings need not be in parallel side walls so long as the shutoff vanes are so situated with respect to the arrangement for movably mounting the damper that the fluid impinging on the shutoff vanes will not produce a resultant torque to move the damper.

In view of the foregoing, it will be seen that I have provided an improved fluid flow control for controlling the amount of fluid flowing per unit of time for variations in differential pressure so that the rate of fluid flow may be controlled within predetermined limits.

Although I have shown and described a particular embodiment of my invention, I do not desire to be limited to the particular embodiment described, and I intend in the appended claims to cover all modifications which do not depart from the spirit and scope of my invention.

What I claim as new and desire to secure by Letters Patent of the United States is:

1. A fluid flow control including a duct having a closed end and a pair of opposing lateral fluid flow openings adjacent said end and a flow actuated movable multivane damper having balancing means for regulating the fluid flow in said duct, said damper having a pair of opposing flow regulating vanes, each movable laterally across a corresponding one of said openings to vary the effective area thereof, and a control vane movable substantially along the path of axial fluid flow within said duct for positioning said damper in response to the velocity of said axial fluid flow.

2. A fluid flow control including a duct having a closed end and a pair of opposing lateral outlet openings therefrom, a swinging damper in said duct having a pair of opposing flow regulating vanes extending perpendicularly to the axis thereof for lateral movement across said opposing openings to vary the effective area thereof and having a control vane extending between said flow regulating vanes for movement substantially along the path of axial fluid flow within said duct to position said damper in response to the velocity of said fluid flow.

3. A fluid flow control including a duct having a closed end and a pair of opposing sector-shaped lateral outlet openings therefrom, a swinging damper having balancing means for regulating the fluid flow in said duct, said damper having a pair of opposing sector-shaped flow regulating vanes perpendicular to the axis thereof for lateral movement across said opposing openings to vary the effective area thereof and having a control vane perpendicular to said flow regulating vanes for movement substantially along the path of axial fluid flow within said duct to position said damper in response to the velocity of said fluid flow.

RONALD W. OLSEN.